(12) United States Patent
Stroebel

(10) Patent No.: US 12,434,517 B2
(45) Date of Patent: Oct. 7, 2025

(54) METHOD FOR ASSISTING DURING A COUPLING PROCESS WITH A TRAILER, COMPUTING DEVICE, AND ASSISTANCE SYSTEM FOR A VEHICLE

(71) Applicant: Bayerische Motoren Werke Aktiengesellschaft, Munich (DE)

(72) Inventor: Michael Stroebel, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 6 days.

(21) Appl. No.: 18/695,567

(22) PCT Filed: Sep. 13, 2022

(86) PCT No.: PCT/EP2022/075379
§ 371 (c)(1),
(2) Date: Mar. 26, 2024

(87) PCT Pub. No.: WO2023/057180
PCT Pub. Date: Apr. 13, 2023

(65) Prior Publication Data
US 2025/0121639 A1    Apr. 17, 2025

(30) Foreign Application Priority Data
Oct. 8, 2021   (EP) .................................. 21201630

(51) Int. Cl.
*B60D 1/36* (2006.01)
*B60W 30/18* (2012.01)
(52) U.S. Cl.
CPC ......... *B60D 1/36* (2013.01); *B60W 30/18009* (2013.01)

(58) Field of Classification Search
None
See application file for complete search history.

(56) References Cited

U.S. PATENT DOCUMENTS

2019/0256139 A1  8/2019  Ziebart et al.
2021/0061281 A1  3/2021  Niewiadomski et al.

FOREIGN PATENT DOCUMENTS

DE  10 2009 045 284 A1  4/2011
DE  10 2010 004 920 A1  7/2011
(Continued)

OTHER PUBLICATIONS

International Search Report (PCT/ISA/210) issued in PCT Application No. PCT/EP2022/075379 dated Dec. 7, 2022 with English translation (5 pages).
(Continued)

*Primary Examiner* — Thomas S McCormack
(74) *Attorney, Agent, or Firm* — Crowell & Moring LLP

(57) ABSTRACT

A method for assisting a driver of a vehicle during a coupling process with a trailer parked parallel to a road. The method comprises receiving surroundings data from at least one surroundings sensor, and detecting that the trailer is parked parallel to the road. The method further comprises determining at least one coupling position allowing the vehicle to be coupled with the trailer parked parallel to the road, and submitting at least one coupling position suggestion to the driver, based on the at least one coupling position. An open space, describing an area located in front of the trailer in the towing direction, is also determined by the surroundings data. The open space depends on an open space length determined in the towing direction of the trailer. Furthermore, the at least one coupling position is determined depending on the open space length.

15 Claims, 5 Drawing Sheets

(56) References Cited

FOREIGN PATENT DOCUMENTS

| DE | 10 2016 215 248 A1 | 2/2018 |
|---|---|---|
| DE | 10 2018 202 613 A1 | 8/2019 |
| DE | 10 2020 122 363 A1 | 3/2021 |
| WO | WO 2015/001065 A1 | 1/2015 |

OTHER PUBLICATIONS

German-language Written Opinion (PCT/ISA/237) issued in PCT Application No. PCT/EP2022/075379 dated Dec. 7, 2022 with English translation (8 pages).

German-language Extended European Search Report issued in European Application No. 21201630.7 dated Mar. 21, 2022 with partial English translation (9 pages).

METHOD FOR ASSISTING DURING A COUPLING PROCESS WITH A TRAILER, COMPUTING DEVICE, AND ASSISTANCE SYSTEM FOR A VEHICLE

BACKGROUND AND SUMMARY

The present disclosure relates to a method for assisting a driver of a vehicle during a coupling process of the vehicle with a trailer parked parallel to a road. Furthermore, the present disclosure relates to an assistance system for a vehicle for supporting a driver of the vehicle during a coupling process of the vehicle with a trailer parked parallel to a road. Finally, the present disclosure relates to a computing device for an assistance system of a vehicle.

Methods and systems for assisting a driver of a vehicle during a coupling process in which a trailer is coupled to the vehicle have been known for some time. Systems of this type are frequently also referred to as a trailer coupling assistant. Generally, the coupling of the trailer is detected with the sensors present on the vehicle, for example, with an ultrasonic sensor, a camera, or the like. Subsequently, the driver can be assisted in maneuvering the vehicle toward a possible coupling position so that the trailer can subsequently be coupled to the vehicle.

Document DE 10 2009 045 284 A1 relates to a method for assisting a driver of a motor vehicle in a driving maneuver for coupling an object to be coupled at a coupling point to a trailer apparatus of the motor vehicle, in which the object to be coupled is stationary and the motor vehicle is moved toward the object to be coupled, in which first of all the distance and the direction of the coupling point with respect to the trailer apparatus of the motor vehicle are detected by at least one distance sensor, and the distance and the direction between the coupling point and trailer apparatus are displayed for the driver.

Laid-open application DE 10 2010 004 920 A1 relates to an apparatus for assisting the coupling of a trailer to a trailer coupling of a motor vehicle, and to a method for coupling a trailer to a motor vehicle. Devices for determining the relative position of a trailer coupling of a trailer with respect to the trailer coupling of the motor vehicle and for controlling the movement of the motor vehicle and/or a relative movement of the trailer coupling of the motor vehicle with respect to the motor vehicle are provided on the basis of the relative position which is determined by sensors.

Document DE 10 2018 202 613 A1 relates to a method for assisting a coupling process of a motor vehicle to a trailer, in which a position of a trailer-side coupling element is identified via a trailer coupling assistant and, on the basis thereof, the vehicle is maneuvered at least partially autonomously into a target position in which a trailer coupling of the motor vehicle is arranged at a predefined coupling position with respect to the trailer-side coupling element. During the maneuvering process, a rear monitoring region of the motor vehicle is monitored via a parking aid. The parking aid is operated in a standard mode when the trailer coupling assistant is deactivated. Furthermore, when the trailer coupling assistant is activated, the parking aid is operated in a coupling mode in which obstacle warnings with reference to the rear region are issued via the parking aid differently than in the standard mode.

It is the object of the present disclosure to provide a solution as to how a driver of a vehicle can be assisted in a manner going beyond the prior art during a coupling process with a trailer.

A method according to the disclosure for assisting a driver of a vehicle during a coupling process of the vehicle, with a trailer parked parallel to a road, comprises receiving environmental data from at least one environmental sensor. In addition, the method comprises detecting the trailer parked parallel to the road via the environmental data. Furthermore, the method comprises determining at least one coupling position which describes a possible position of the vehicle for coupling the trailer parked parallel to the road. Finally, the method comprises presenting at least one coupling position suggestion to the driver, wherein the coupling position suggestion is based on the at least one coupling position. In the method, a free area, which describes an area located in front of the trailer in the towing direction, is also determined via the environmental data. In addition, the free area is characterized in accordance with a free area length determined in the towing direction of the trailer. Furthermore, the at least one coupling position is determined depending on the characterized free area length.

The vehicle can be in the form, for example, of a passenger vehicle. Furthermore, the vehicle may also be a truck, a utility vehicle, a motor home or the like.

The trailer may be in the form, for example, of a simple passenger vehicle trailer which can have both an overrun brake and its own service brake. Furthermore, boat trailers, caravans, horse trailers, semitrailers or the like are also conceivable. In general, the steering technology of the trailer is insignificant. In particular, it may therefore be an unsteered trailer (rigid axle). Furthermore, the trailer may also have pivot axle steering or single pivot steering.

The term "coupling process", as is used in this document, in particular also comprises the manual and at least partially automated maneuvering of the vehicle along a trajectory, at one end of which the trailer can be coupled to the vehicle or at the other end of which the vehicle is in the coupling position.

The term "at least partially automated" driving or maneuvering should be understood within the context of the document as meaning driving or maneuvering with automated transverse and/or longitudinal guidance. The term "at least partially automated" driving or maneuvering comprises automated driving with any desired degree of automation. Degrees of automation include by way of example assisted, partially automated, highly automated, fully automated and autonomous driving (each with an increasing degree of automation).

In the method according to the disclosure, the driver of the vehicle is therefore assisted during a coupling process in which the vehicle is intended to be coupled to a trailer parked parallel to a road. The driver can, for example, slowly maneuver the vehicle past the trailer, with environmental data from at least one environmental sensor detecting and describing an environment of the vehicle in which the trailer is located during the maneuvering. An approach of this type is already known from what are referred to as parking assistants.

Preferably, the at least one environmental sensor is arranged on the vehicle. The at least one environmental sensor can be, for example, a camera, a radar sensor, a lidar sensor, an ultrasonic sensor, or the like. In particular, a combination of various types of sensors is thus also possible. In particular, it is conceivable for both an ultrasonic sensor and a camera to be used. The trailer parked parallel to the road can be detected via the environmental data. In addition, the free area which is located in front of the trailer in the towing direction can also be detected and/or determined via the environmental data. Furthermore, it is also conceivable that the at least one environmental sensor, for example, in the form of at least one ultrasonic sensor or a camera, is arranged on the trailer and transmits the environmental data by radio or wired connection. The at least one environmental sensor may also be part of an infrastructure system. For example, an infrastructure system of this type can be a car park system or a traffic monitoring system. Known keywords in this connection are what are referred to as automated valet parking systems and what are referred to as smart city systems.

The detected trailer can be described, for example, by an orientation of the trailer longitudinal axis, i.e., the longitudinal axis of the trailer, by the position of the trailer coupling of the trailer, by the position of the axles, and/or by its dimensions.

If the trailer has pivot axle steering or single pivot steering, it may be of advantage if, when determining the at least one coupling position, a rotational movement of the steered axle is additionally taken into consideration. For example, in the case of pivot axle steering or single pivot steering, the drawbar of the trailer may not be aligned parallel to the longitudinal axis of the entire trailer and/or because of this the trailer cannot be coupled directly to the vehicle. In such a situation, it is nevertheless of advantage if a rotational region of the drawbar is detected and taken into consideration in the determination of the at least one coupling position. Thus, in the situation just described, at least one coupling position can be determined in which, in order to couple the trailer to the vehicle, if the latter is in the at least one coupling position, the drawbar or the steered axle of the trainer may have to be moved rotationally. An analogous example arises if the longitudinal axis of the (unsteered) trailer is oriented, for example, at an angle of 15° with respect to the road (in the direction of the road edge) and the trailer consequently is not positioned absolutely parallel to the road and therefore has to be additionally moved rotationally for the coupling.

In this document, the term "trailer coupling unit" and the term "vehicle coupling unit" are used below. The term "trailer coupling unit" and the term "vehicle coupling unit" are intended in general to denote two mechanically interacting, for example intermeshing, apparatuses which are designed to connect the vehicle to the trailer. Depending on the type of vehicle and trailer, for example, a drawbar coupling, an open end coupling, or a fifth wheel coupling is conceivable, and corresponding coupling parts are intended to be covered by the term "trailer coupling unit" or the term "vehicle coupling unit". In particular, the term "trailer coupling unit" and the term "vehicle coupling unit" are also intended to be understood as meaning the corresponding coupling parts of a ball head coupling, i.e., a ball coupling, or coupling ball, which especially in the passenger vehicle sector together with lightweight trailers (with/without an overrun brake) meet the current coupling standard.

The term "coupling position", as is used in this document, describes a position of a vehicle and trailer, in which the trailer can be coupled directly or following a (slight) movement of the trailer and/or the drawbar of the trailer to the vehicle. If the vehicle is in the coupling position with respect to the trailer, it is therefore conceivable, for example in the case of a ball head coupling, that lowering of the ball coupling may already be sufficient to couple the trailer to the vehicle and the coupling ball thereof. However, it is likewise also conceivable for the trailer and/or the drawbar of the trailer to additionally have to be moved, for example laterally and/or rotationally, until the trailer coupling unit can interact mechanically with the vehicle coupling unit in order to couple the vehicle to the trailer. A slight movement should be understood here as meaning in particular a lateral movement of a few centimeters, for example less than 50 cm, wherein the rotational movement may also be 60° or more.

The detection of the free area is comparable to the detection of a parking gap during an assisted parking process. The free area may be described, for example, in the form of a rectangle. Irrespective thereof, the free area may be assigned a free area length. The free area length describes the length of the free area in the towing direction of the trailer. The free area may be characterized in accordance with the free area length. For example, it is conceivable, if the free area is of a sufficient size, that the vehicle can be parked or positioned in front of the trailer in the longitudinal direction for coupling of the trailer to the vehicle. If the free area length is of a sufficient size, the free area can therefore be characterized in such a manner that the vehicle can be parked or positioned in front of the trailer in the longitudinal direction. Conversely, it is conceivable for a free area length to characterize the free area by the fact that the vehicle cannot be parked in front of the trailer in the longitudinal direction.

At least one coupling position can be determined with reference to the detected trailer parked parallel to the road, via the environmental data, and the detected and characterized free area. The at least one coupling position describes at least one possible position of the vehicle for coupling the trailer parked parallel to the road. As previously described, for example, a coupling position can be suggested to the driver of the vehicle, in which coupling position the vehicle is positioned in front of the trailer in the towing direction and the coupling angle is 0°, if the free area is of a sufficient size to park or to position the vehicle in front of the trailer in the longitudinal direction. In this connection, the coupling angle describes the orientation of the longitudinal axis of the vehicle relative to the longitudinal axis of the trailer. In other words, the coupling angle therefore describes the angle between the vehicle longitudinal axis and the trailer longitudinal axis.

The at least one coupling position suggestion which is based on the at least one coupling position can be presented to the driver of the vehicle, for example via a human-machine interface. In particular, presentation via augmented reality, voice, displays, and/or the like is therefore conceivable. If the driver can be presented with a plurality of coupling position suggestions, it is conceivable for the driver to select the corresponding coupling position suggestion via a possible operator control element. In particular, touch screens, gesture control, voice control, and conventional operator control elements in the form of buttons, dials, and/or switches can be used for this purpose.

A further advantageous embodiment makes provision that if the free area length exceeds a first minimum length, which is predetermined depending on the vehicle, the at least one coupling position describes a position of the vehicle, in which the vehicle is located completely within the free area. If, for example, the passenger vehicle is a compact car, the predetermined first minimum length may be, for example, 7 m. A conventional parking gap, the length of which corresponds to such a predetermined first minimum length or exceeds the latter, is generally sufficient for parking a compact car in one move in a longitudinal direction parallel to the road. Therefore, if, in this case, the free area length exceeds the predetermined first minimum length, the vehicle can be parked in one move in front of the trailer in the towing direction, or can be maneuvered into a coupling position such that the trailer can subsequently be coupled to the vehicle. In such a case, the vehicle is therefore located completely within the free area. The width of the free area can therefore be in particular larger than or equal to the width of the vehicle. Consequently, the at least one coupling position describes a position of the vehicle, in which the vehicle is located completely within the free area. In particular, in such a coupling position, the wheels of the vehicle are therefore located within the free area.

Furthermore, it is advantageous that if the free area length exceeds a second minimum length, which is predetermined depending on the vehicle, the at least one coupling position describes a position of the vehicle, in which the vehicle is located in certain regions within the free area. When a trailer is parked parallel to the road, for example on a hard shoulder of the road, a further road user or in general an obstacle may often be located in front of the trailer in the towing direction and the towing vehicle, i.e. the vehicle to which the trailer is intended to be coupled, cannot be placed directly in front of the trailer. Coupling of the trailer to the vehicle at a coupling angle of 0° may therefore not be possible.

Nevertheless, that is, although a further road user or a general obstacle is located in front of the trailer and, because of it, the driver of the vehicle cannot be presented with a coupling position suggestion which is comparable to a parking maneuver in the longitudinal direction, there may be a small clearance which allows at least a coupling position at a coupling angle not equal to 0. In the course thereof, it is therefore of advantage if the free area length exceeds a second minimum length which is predetermined depending on the vehicle. In particular, the predetermined second minimum length may be dependent on the width of the vehicle. In the case of a passenger vehicle which has, for example, a length of 5 m and a width of 2 m, the predetermined second minimum length can be, for example, 4 m.

If the free area length then exceeds such a predetermined second minimum length, it is conceivable that the vehicle, for coupling the trailer to the vehicle, is positioned in such a manner that the vehicle longitudinal axis is not oriented parallel to the direction of travel of the road and, as a result, the vehicle is positioned only in certain regions within the free area. It is therefore conceivable, for example, that the vehicle is located with the two rear wheels within the free area, whereas the front wheels of the vehicle are located outside the free area, and the vehicle is nevertheless positioned in such a manner that the trailer can be coupled to the vehicle. In summary, it is therefore advantageous in this case if the driver of the vehicle is presented with a coupling position suggestion of this kind which is based on a coupling position in which the vehicle is located only in certain regions within the free area.

Within the scope of a further embodiment, it is advantageous if the free area length falls short of a second minimum length, which is predetermined depending on the vehicle, the at least one coupling position describes a position of the vehicle, in which the vehicle is located substantially outside the free area. If the trailer parked parallel to the road has been parked, for example, completely by another road user, it is possible that the vehicle cannot be positioned in such a manner that the trailer can be coupled to the vehicle without an additional movement. In other words, a coupling position in which the trailer can be coupled to the vehicle without an additional maneuvering of the trailer therefore does not exist. Nevertheless, at least one coupling position can be determined in which the vehicle is positioned in such a manner that the trailer only has to be moved slightly for the coupling to the vehicle. Although the trailer therefore cannot be coupled directly to the vehicle, the driver of the vehicle can nevertheless be presented with at least one coupling position suggestion.

A fully parked trailer parked parallel to the road is characterized, for example, in that virtually no free space is available in front of the trailer in the towing direction. In other words, an area located in front of the trailer in the towing direction may turn out to be so small that a vehicle cannot be positioned in certain regions within the free area at all. In such a case, the free area length may fall short of a predetermined second minimum length. The predetermined second minimum length can depend on the dimensions of the vehicle. In particular, the predetermined second minimum length can depend on the width of the vehicle.

The vehicle is located here substantially outside the free area if, for example, only a rear wheel is positioned within the free area or if, for example, only part of the rear bumper is positioned within the free area. The vehicle is also in particular located substantially outside the free area if no part of the vehicle is located within the free area which is at least as wide as the wheelbase of the vehicle.

In addition, it is advantageous if the at least one coupling position, in which the vehicle is located substantially outside the free area, is determined in such a manner that, for the coupling of the trailer parked parallel to the road, the trailer has to be moved manually exclusively rotationally. For example, a trailer which has only one axle can be moved rotationally about a point of its axle. For example, a trailer can therefore be moved rotationally in such a way that one wheel remains virtually in its starting position whereas the opposite wheel moves about the wheel, which remains in the starting position and is optionally braked in such a situation. However, the trailer may also be moved rotationally about a different point. In particular, the trailer may also be moved rotationally about the center point of the axle.

An analogous example is also true of trailers having one axle and more than two wheels. In such a case, a return can be made in terms of driving dynamics to the single axle case with two wheels by, for example, the center point of the wheels of the side in question being considered. In the case of multi-axle (unsteered) trailers, the point about which the trailer is moved rotationally can lie along a center axis, i.e. in particular at the center point of all of the axes.

If the trailer has pivot axle steering or single pivot steering, it may be of advantage if the at least one coupling position, in which the vehicle is located substantially outside the free area, is determined in such a manner that, for the coupling of the trailer parked parallel to the road, only the steered axle has to be moved rotationally. It may therefore be of advantage if the at least one coupling position is determined in such a manner that, in the case of pivot axle steering or single pivot steering, only one axle is moved rotationally.

A coupling position can therefore be suggested to the driver of the vehicle although the vehicle cannot be positioned in front of the trailer in the towing direction. The at least one coupling position which is suggested to the driver of the vehicle can therefore be determined in such a manner that the trailer coupling unit of the trailer coupling of the trailer can interact mechanically with the vehicle coupling unit of the trailer coupling of the vehicle after the manually exclusively rotational movement. In particular, in the case of a ball head coupling, the ball coupling can therefore be connected directly to the coupling ball after the manually exclusively rotational movement and a possible lowering action, so that the trailer is coupled to the vehicle.

A further advantageous embodiment makes provision that the environmental data are received from the at least one environmental sensor as the vehicle moves at least in certain regions past the trailer, which is parked parallel to the road, and/or past the free area. While the vehicle moves past the trailer parked parallel to the road, environmental data can be received from the at least one environmental sensor. Depending on which environmental sensors are used here, the section covered by the vehicle as it moves in certain regions past may differ. For example, in the case of ultrasonic sensors, it may be necessary for the vehicle to move completely past the trailer and/or the free area. If, by contrast, a camera is alternatively or additionally used, it is conceivable for a movement past only in certain regions to be necessary.

It may therefore be sufficient, for example, if the vehicle does not completely pass the trailer and/or the free area. The coupling position suggestion or the at least one coupling position may therefore possibly already be determined at an early point. In the method according to the disclosure and its presented preferred embodiments, it is, however, also necessary, compared to a parking assistant, to reliably detect the trailer which is located behind the free area.

In addition, it is advantageous if the at least one coupling position is determined in such a manner that a predetermined maximum number of direction of travel changes necessary for reaching the at least one coupling position is fallen short of. It is conceivable that the driver of the vehicle will find it annoying if extensive maneuvering has to be carried out in order to reach the at least one coupling position. It may therefore be of advantage if the at least one coupling position is determined in such a manner that the at least one coupling position can also be achieved within a predetermined number of direction of travel changes. It is conceivable here for the predetermined maximum number of direction of travel changes to be predefined by the driver of the vehicle, for example within the scope of an input in a menu of the vehicle. If the predetermined maximum number of direction of travel changes is, for example, three direction of travel changes, the at least one coupling position can therefore be determined in such a manner that such a maximum number of direction of travel changes is fallen short of or else, when the at least one coupling position suggestion is presented to the driver, only those coupling positions of the at least one coupling position can be selected which fall short of the predetermined maximum number of direction of travel changes.

Furthermore, it is advantageous if at least one dimension of the trailer is determined via the environmental data and/or is predefined by the driver, said dimension being used to determine the at least one coupling position. In particular, in the case of complex coupling processes, or if the trailer cannot be completely detected, it may be of advantage if the dimensions of the trailer are known. That is to say, it is therefore conceivable that the at least one dimension of the trailer is determined via the environmental data. For example, the at least one dimension of the trailer can be determined via an ultrasonic sensor during a movement past the trailer.

However, it is also conceivable that the dimension of the trailer is determined via a camera. In a particularly simple and also highly accurate way, the at least one dimension of the trailer can be defined by the driver. It is conceivable for the driver of the vehicle to define the at least one dimension of the trailer in a menu of the vehicle.

If the at least one coupling position envisages a manual movement of the trailer, knowledge about the at least one dimension of the trailer is of particular advantage. In particular, the position of the axle or of the axles relative to the position of the trailer coupling unit of the trailer may be of importance in this case. If, therefore, the at least one dimension of the trailer is known, the accuracy of the at least one coupling position suggestion and/or the precision of an at least partially automated maneuvering of the vehicle toward the at least one coupling position can be improved.

Finally, a further advantageous refinement makes provision that the vehicle and a body of the trailer, which is defined by the at least one dimension of the trailer, are at a predetermined minimum distance if the vehicle is in the at least one coupling position. In some of the previously described scenarios, in particular if the coupling angle between the vehicle longitudinal axis and the trailer longitudinal axis is not equal to zero, the distance between the vehicle body and the body of the trailer may be only a few centimeters, for example 20 cm. Such a coupling position may be disadvantageous for the driver of the vehicle for the direct coupling. This is because if there is only little space available between the vehicle body and the body of the trailer, the driver of the vehicle may have to go around the vehicle or around the trailer in order to reach the trailer coupling of the vehicle or the trailer coupling of the trailer.

If only the coupling positions are suggested to the driver of the vehicle or only the coupling positions are selectable for the driver of the vehicle where the vehicle and the body of the trailer are at a predetermined minimum distance, the coupling process in which the trailer coupling unit of the trailer can be connected directly to the vehicle coupling unit of the vehicle may possibly be simplified for the driver of the vehicle. It is also conceivable in this case that such a predetermined minimum distance is taken into consideration only at positive or only at negative coupling angles.

Within the scope of the document, a positive coupling angle or a positive angle between the vehicle longitudinal axis and the trailer longitudinal axis is referred to if the combination of vehicle and trailer passes through, for example, a left-hand corner. The driver's seat of the vehicle is conventionally located on the left side of the vehicle. In the case of a positive coupling angle between the vehicle longitudinal axis and the trailer longitudinal axis, it may accordingly be that the vehicle and the body of the trailer are positioned with respect to each other in such a way that the driver of the vehicle has to go around the vehicle or around the trailer in order to couple the trailer to the vehicle. This may be perceived as being unpleasant for the driver of the vehicle. In such a case, it is therefore desirable if the vehicle and the body of the trailer are at a predetermined minimum distance. It is conceivable here for the driver to define the predetermined minimum distance themselves. Such a definition can be undertaken, for example, via a menu of the vehicle.

Finally, a further advantageous embodiment makes provision that a coupling angle between the longitudinal axis of the vehicle and the longitudinal axis of the trailer falls short of a maximum coupling angle, which is predetermined by the at least one dimension of the trailer, if the vehicle is in the at least one coupling position. Via such a maximum coupling angle, it is possible, for example, to avoid the vehicle and the body of the trailer colliding with each other. Furthermore, via a maximum coupling angle, a more pleasant starting position for the driver can be ensured when they drive off with the combination of vehicle and trailer.

A computing device according to the disclosure is designed for carrying out a method according to the disclosure and the advantageous refinements thereof. The computing device can preferably comprise one or more programmable processors which process a computer program code loaded into its working memory.

An assistance system according to the disclosure for a vehicle is designed for carrying out a method according to the disclosure and the advantageous refinements thereof. The assistance system can have at least one environmental sensor with which environmental data which describe the environment of the vehicle can be provided. Furthermore, the assistance system can have a computing device according to the disclosure which can be formed, for example, by at least one electronic control unit. In addition, the assistance system can comprise a human-machine interface for presenting at least one coupling position suggestion. Furthermore, the assistance system can be designed to maneuver the vehicle into a coupling position in an at least partially automated manner.

A further aspect of the disclosure relates to a computer program comprising commands which, when the program is executed by a computing device, cause the latter to carry out a method according to the disclosure and the advantageous refinements thereof. Furthermore, the disclosure relates to a computer-readable (storage) medium comprising commands which, during execution by a computing device, cause the latter to carry out a method according to the disclosure and the advantageous refinements thereof.

The preferred embodiments presented with regard to the method according to the disclosure and the advantages of said embodiments apply correspondingly to the computing device according to the disclosure, to the assistance system according to the disclosure, to the vehicle according to the disclosure, to the computer program according to the disclosure and to the computer-readable (storage) medium according to the disclosure.

Further features of the disclosure emerge from the claims, the figures and the description of the figures. The features and combinations of features mentioned above in the description, and the features and combinations of features mentioned below in the description of the figures and/or shown on their own in the figures are usable not only in the respectively stated combination, but also in other combinations or by themselves without departing from the scope of the disclosure.

BRIEF DESCRIPTION OF THE DRAWINGS

The disclosure will now be explained in more detail using preferred exemplary embodiments and with reference to the attached drawings.

In the figures, identical or functionally identical elements are provided with the same reference signs.

DETAILED DESCRIPTION OF THE DRAWINGS

Figure 1:
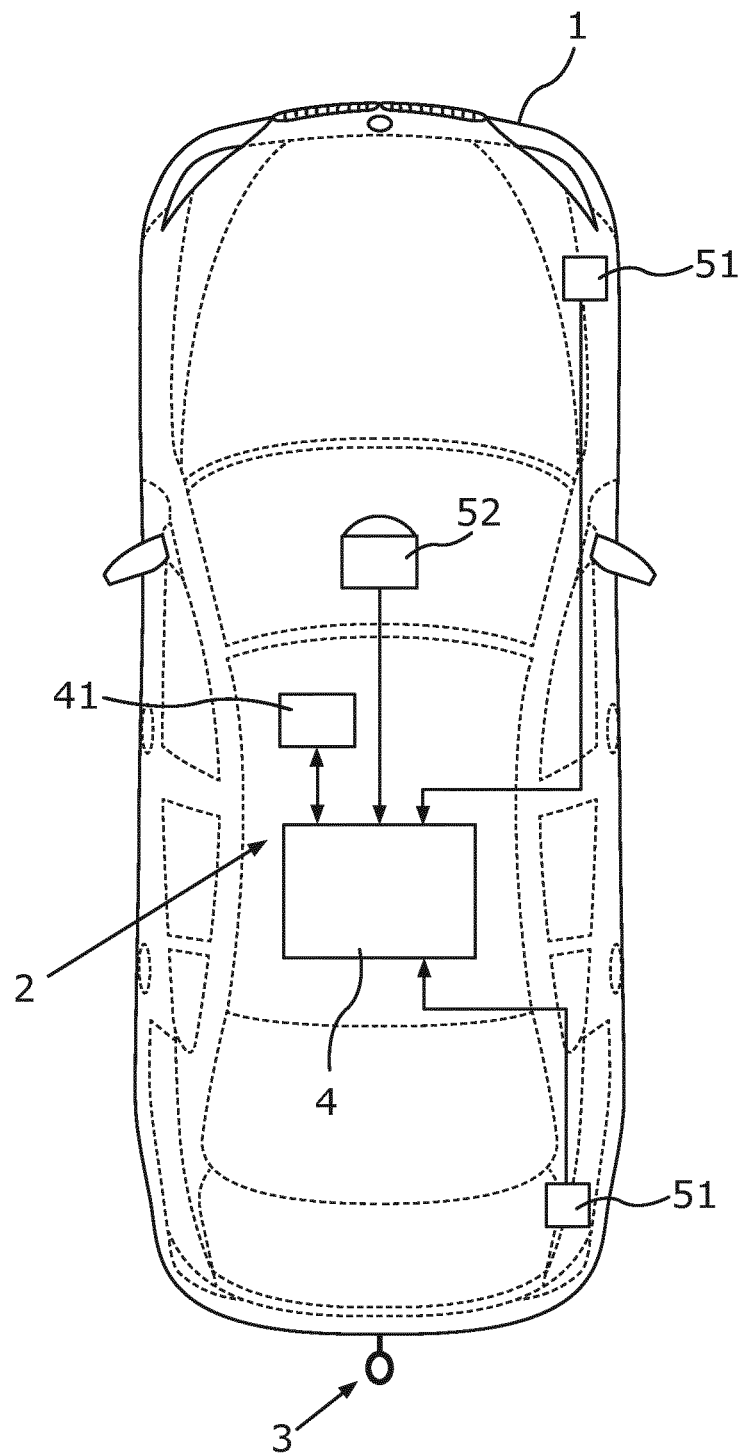
FIG. 1 shows a schematic illustration of a vehicle, comprising an assistance system for assisting during a coupling process with a trailer.

FIG. 1 shows, in a schematic illustration, a vehicle 1 which has an assistance system 2 for assisting a driver of a vehicle 1 during a coupling process of the vehicle with a trailer 7 parked parallel to a road 8. In order to couple the trailer 7 parked parallel to the road 8 to the vehicle, the vehicle 1 has a trailer coupling 3 in the form of a ball head coupling. A computing device 4 receives environmental data from at least one environmental sensor 51, 52. In FIG. 1, the vehicle 1 has a camera 52 and two ultrasonic sensors 51 as the environmental sensors 51, 52.

A trailer 7 parked parallel to the road 8 can thus be detected via the environmental data. In addition, a free area 11 can be determined via the environmental data. A coupling position which describes a possible position of the vehicle 1 for coupling the trailer 7 parked parallel to the road 8 can be determined depending on the free area 11. Subsequently, at least one coupling position suggestion which is based on the at least one coupling position can be presented to the driver of the vehicle 1 or to a user of the vehicle 1. The coupling position suggestion can be presented, for example, via a human-machine interface 41.

The vehicle 1 is illustrated here by way of example as a passenger vehicle. Furthermore, however, the vehicle may also be a truck, a utility vehicle, a motor home or the like.

Figure 2:
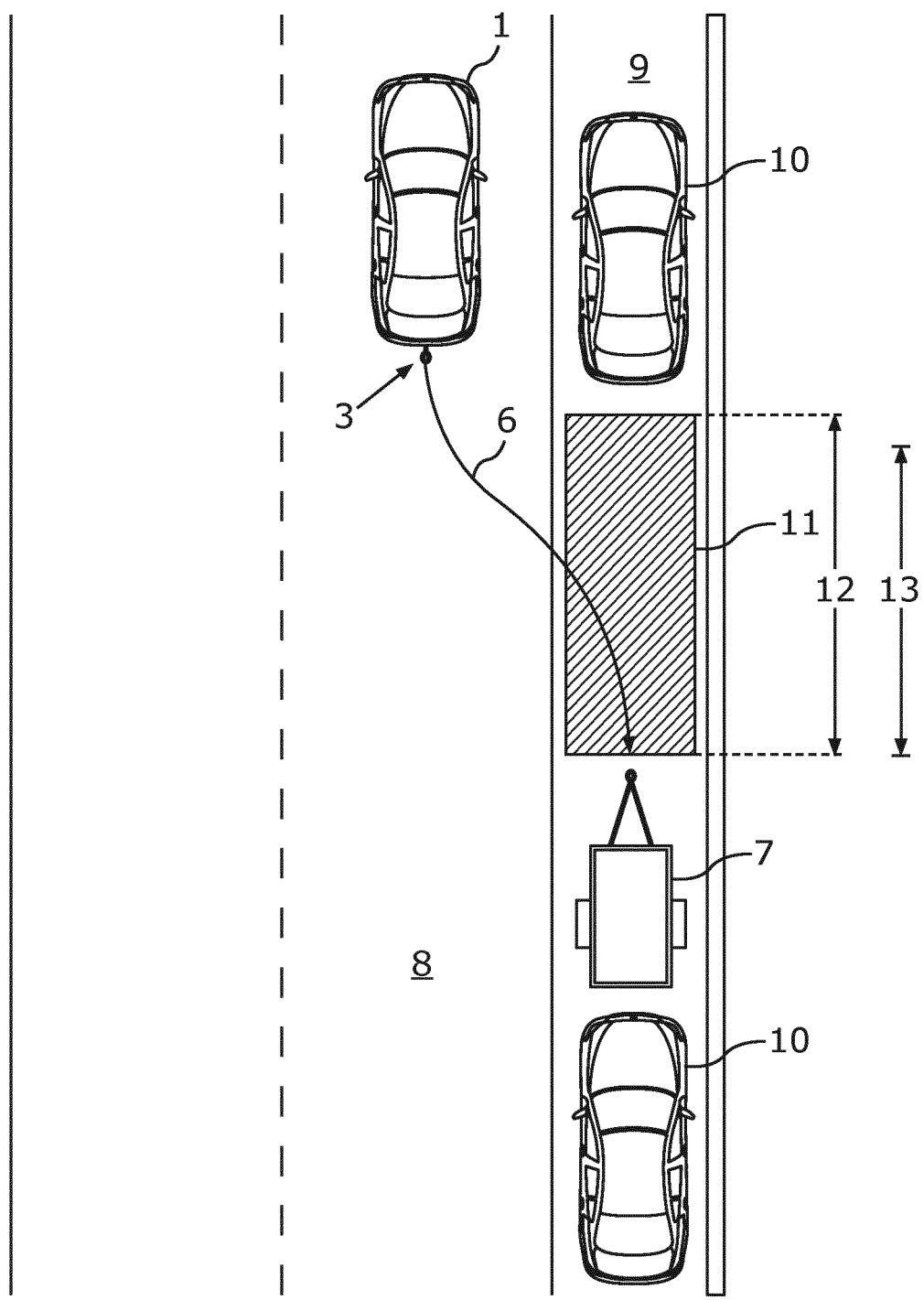
FIG. 2 shows a schematic illustration of a vehicle which, during a coupling process with a trailer parked parallel to a road, moves along a trajectory and, for the coupling, is located completely within a free area.

FIG. 2 shows, in a schematic illustration, the vehicle 1 which, during a coupling process with a trailer 7 parked parallel to a road 8, moves along a trajectory 6, at the end of which the trailer 7 parked parallel to the road 8 can be coupled to the vehicle 1. The trailer 7 parked parallel to the road 8 can be detected via the environmental data of the at least one environmental sensor 51, 52. The trailer 7 parked parallel to the road 8 is located on a hard shoulder 9. A further road user 10 is located behind the trailer 7. In front of the trailer 7 in the towing direction there is a free area 11 which is an unused parking space on the hard shoulder 9. The free area 11 is delimited by the trailer 7 and a further road user 10 located in front of the trailer 7 and the free area 11 in the towing direction.

The free area 11 can be characterized in accordance with its extent in the towing direction of the trailer 7, the free area length 12. In FIG. 2, the free area 11 can be characterized, for example, in that the vehicle 1 can be positioned completely within the free area 11 via a parking maneuver along the trajectory 6. Consequently, in the situation of FIG. 2, at least one coupling position can be determined in which the vehicle 1 is located completely within the free area 11. The width of the free area 11 may be in particular larger than or equal to the width of the vehicle 1.

So that the at least one coupling position in which the vehicle is located completely within the free area 11 can be reached via as simple a trajectory 6 as possible, or with as few direction of travel changes as possible during maneuvering along the trajectory 6 for the vehicle 1, it is of advantage if the free area length 12 exceeds a predetermined first minimum length 13 in the characterization of the free area 11 via the free area length 12. A predetermined first minimum length 13 can be determined, for example, by the vehicle 1 being able to be positioned completely within the free area 11 via a parking maneuver. In particular, the predetermined first minimum length 13 can depend on the length of the vehicle 1.

The trailer 7 is illustrated here by way of example as a simple passenger vehicle trailer. However, the trailer 7 may also be a boat trailer, a motor home, a horse trailer, a semitrailer, or the like. In the present example, it is an unsteered trailer. However, it is also conceivable for the trailer to have pivot axle steering or single pivot steering.

Figure 3:
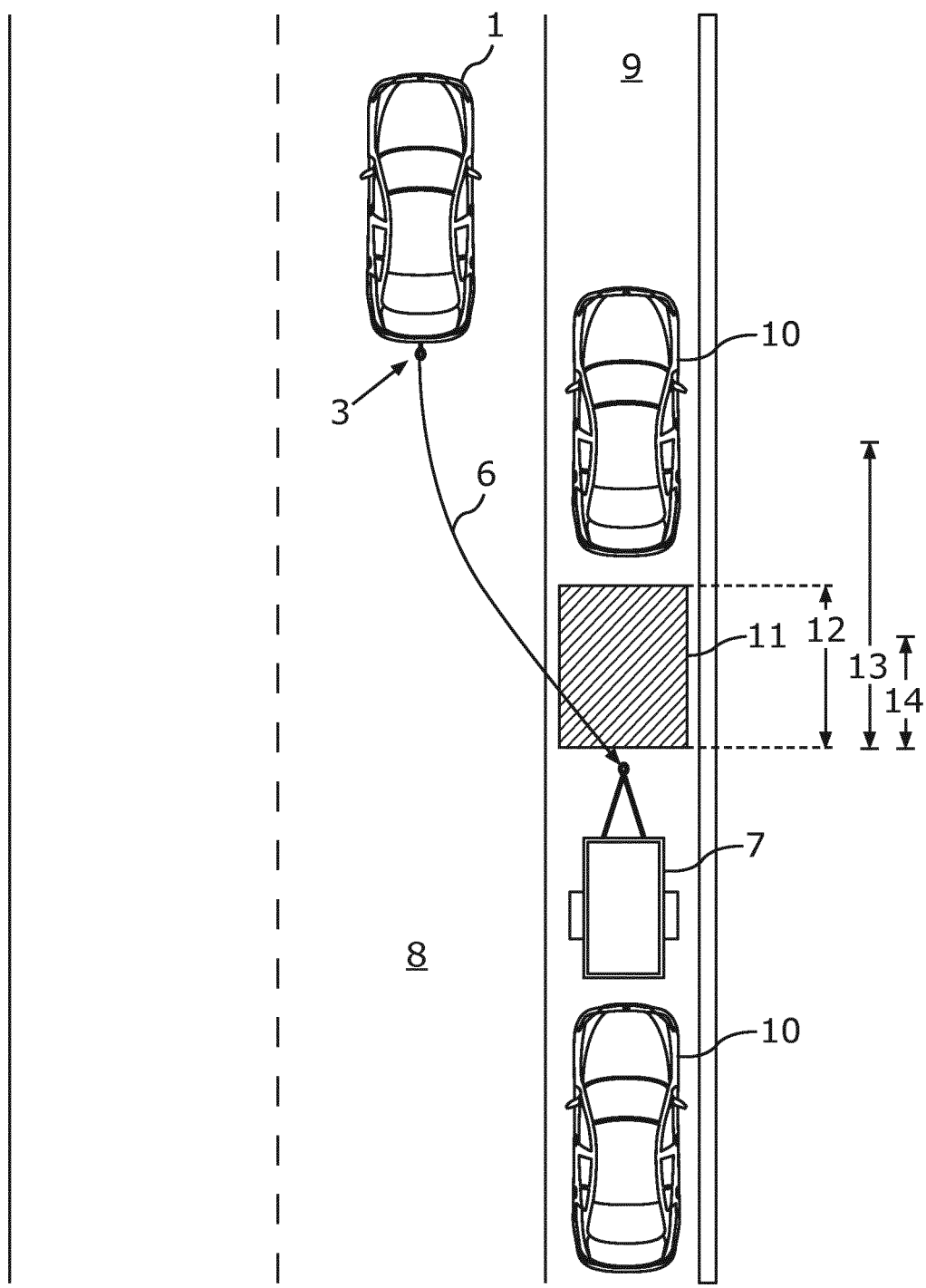
FIG. 3 shows a schematic illustration of a vehicle which, during a coupling process, moves along a trajectory and, during the coupling of the trailer parked parallel to a road, is located at least in certain regions within a free area.

FIG. 3 shows, in a schematic illustration, the vehicle 1 which, during a coupling process with a trailer 7 parked parallel to a road 8, is moved along a trajectory 6, at the end of which the trailer 7 parked parallel to the road 8 can be coupled to the vehicle 1. The trailer 7 is located on the hard shoulder 9 and is parked parallel to the road 8. In front of the trailer 7 in the towing direction there is the free area 11. The free area 11 is delimited by the trailer 7 and by a further road user 10.

In contrast to FIG. 2, the free area 11 in FIG. 3 is, however, not of a sufficient size for positioning the vehicle 1 in front of the trailer 7 in the longitudinal direction. However, at least one coupling position in which the vehicle 1 is located in certain regions within the free area 11 can be determined. In this situation, the free area 11 can therefore be characterized, for example, in that the vehicle 1 cannot be positioned in front of the trailer 7 in the longitudinal direction, but can be positioned in certain regions within the free area 11 via maneuvering along the trajectory 6. In other words, the free area 11 can be characterized via the free area length 12, for example, in that the free area length 12 falls short of a predetermined first minimum length 13, and exceeds a predetermined second minimum length 14. The predetermined second minimum length 14 can depend in particular on the width and/or the length of the vehicle 1.

In this example, after maneuvering along the trajectory 6, the vehicle 1 can be positioned in such a manner that the two rear wheels are located within the free area 11, whereas the front wheels of the vehicle 1 are located outside the free area 11, and the trailer 7 can nevertheless be directly coupled to the vehicle 1. The driver of the vehicle 1 can therefore be presented with at least one coupling position suggestion which is based on a coupling position in which the vehicle is located at least in certain regions within the free area 11.

Figure 4:
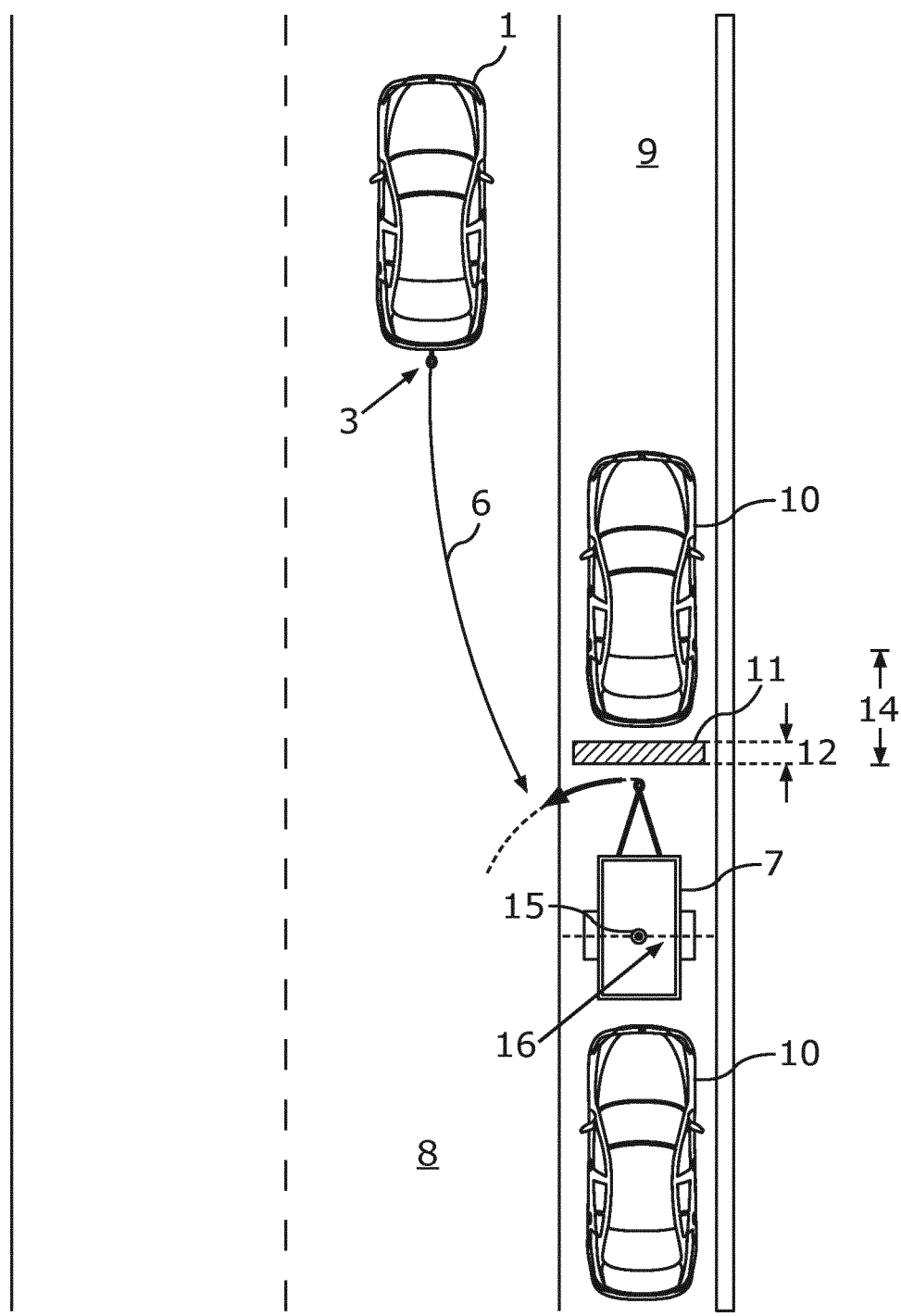
FIG. 4 shows a schematic illustration of a vehicle which, during a coupling process, moves along a trajectory, and, during the coupling of a trailer parked parallel to a road, is substantially located outside a free area; and, FIG. 5 shows a schematic illustration of a vehicle and of the trailer coupled to the vehicle following the coupling process illustrated in FIG. 4.

FIG. 4 shows, in a schematic illustration, the vehicle 1 which, during a coupling process with a trailer 7 parked parallel to a road 8, moves along a trajectory 6, at the end of which the trailer 7 parked parallel to the road 8 can be coupled to the vehicle 1 only after a rotational movement. The trailer 7 is located on the hard shoulder 9 and is parked parallel to the road 8. In front of the trailer in the towing direction there is a free area 11 which, in this example, is extremely small and is delimited by the trailer 7 and a further road user 10 located directly in front of the trailer 7.

The free area 11 can be characterized in FIG. 4, for example, by the fact that the vehicle 1 cannot be positioned in front of the trailer 7 in the longitudinal direction, and cannot even be positioned in certain regions within the free area 11 such that the trailer 7 can be coupled directly to the vehicle 1. In other words, the free area 11 can be characterized via the free area length 12, for example, in that the free area length 12 even falls short of a predetermined second minimum length 14. Nevertheless, at least one coupling position can be determined in which the vehicle 1 is positioned in such a manner that the trailer 7 for coupling to the vehicle 1 can be coupled to the vehicle 1 after a rotational movement. In other words, the driver of the vehicle 1 can therefore nevertheless be presented with at least one coupling position suggestion.

Figure 5:
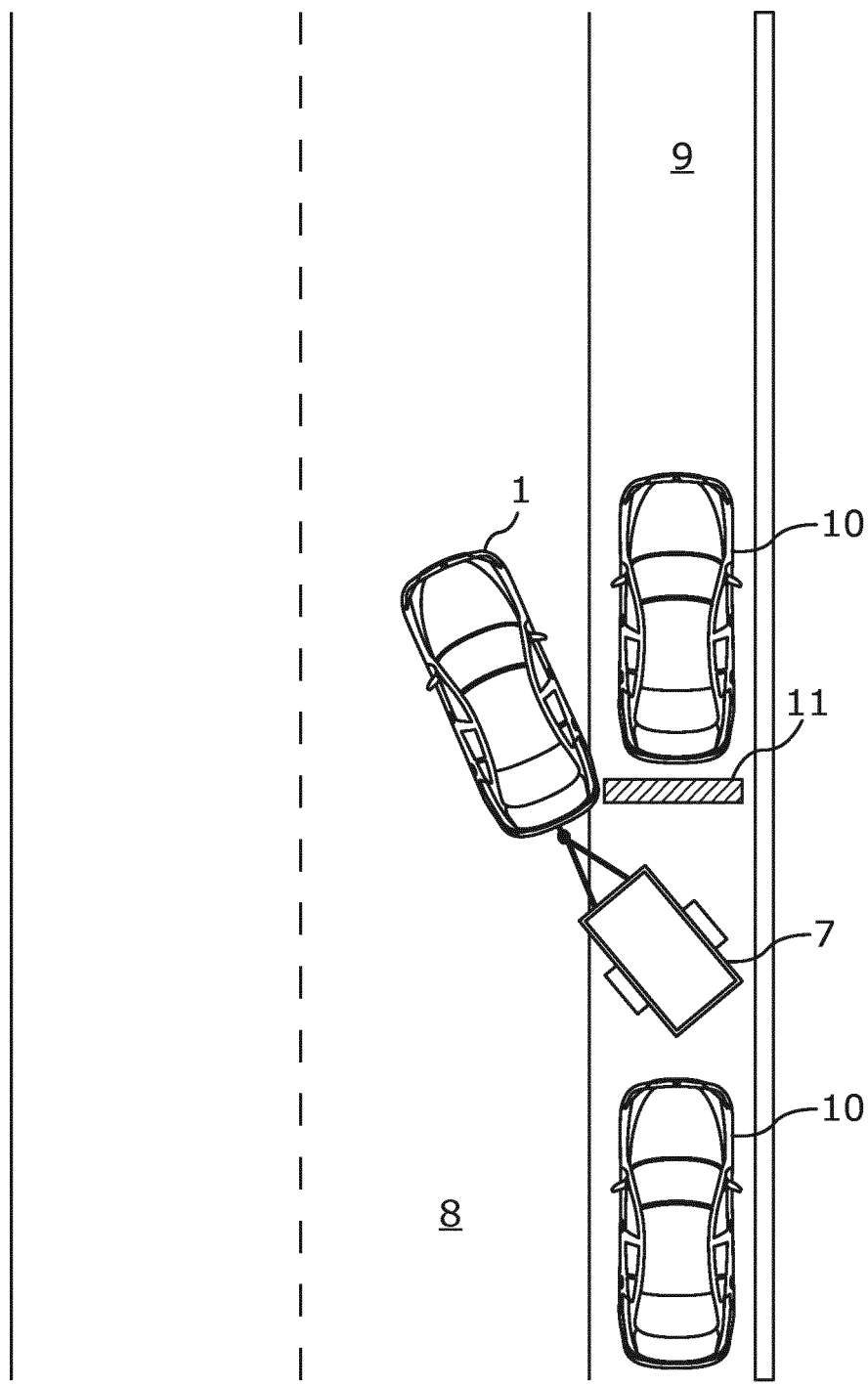

If the vehicle 1 is located in the at least one coupling position, the trailer 7 can be moved rotationally, for example, about a point 15 which can lie along the axis 16 of the trailer 7. FIG. 5 illustrates the trailer 7 coupled to the vehicle 1 according to the situation described in FIG. 4. The at least one coupling position suggestion which can be presented to the driver of the vehicle 1, for example in the situation of FIG. 4, can likewise be presented to the driver of the vehicle 1 in the situation of FIG. 2 and in the situation of FIG. 3.

Also, the at least one coupling position suggestion which can be presented to the driver of the vehicle 1 in the situation of FIG. 3, can be presented to the driver of the vehicle 1 in the situation of FIG. 2.

What is claimed is:

1. A method for assisting a driver of a vehicle during a coupling process of the vehicle with a trailer parked parallel to a road, the method comprising:
   receiving environmental data from at least one environmental sensor,
   detecting the trailer is parked parallel to the road via the environmental data,
   determining at least one coupling position which describes a possible position of the vehicle for coupling the trailer parked parallel to the road, and
   presenting at least one coupling position suggestion to the driver, wherein the coupling position suggestion is based on the at least one coupling position,
   wherein a free area located in front of the trailer in the towing direction is determined via the environmental data, the free area having a free area length determined in the towing direction of the trailer, and
   wherein the at least one coupling position is determined depending on the free area length.

2. The method according to claim 1, wherein:
   if the free area length exceeds a first minimum length, which is predetermined depending on the vehicle, the at least one coupling position describes a position of the vehicle in which the vehicle is located completely within the free area.

3. The method according to claim 1, wherein:
   if the free area length exceeds a second minimum length, which is predetermined depending on the vehicle, the at least one coupling position describes a position of the vehicle in which the vehicle is located in certain regions within the free area.

4. The method according to claim 1, wherein:
   if the free area length falls short of a second minimum length, which is predetermined depending on the vehicle, the at least one coupling position describes a position of the vehicle in which the vehicle is located substantially outside the free area.

5. The method according to claim 4, wherein:
   the at least one coupling position, in which the vehicle is located substantially outside the free area, is determined such that, for the coupling of the trailer parked parallel to the road, the trailer has to be moved manually exclusively rotationally.

6. The method according to claim 1, wherein:
   the environmental data are received from the at least one environmental sensor as the vehicle moves at least in certain regions past the trailer, which is parked parallel to the road, and/or past the free area.

7. The method according to claim 1, wherein:
   the at least one coupling position is determined such that a predetermined maximum number of direction of travel changes necessary for reaching the at least one coupling position is fallen short of.

8. The method according to claim 1, wherein:
at least one dimension of the trailer is determined via the environmental data and/or is predefined by the driver, said dimension being used to determine the at least one coupling position.

9. The method according to claim 8, wherein:
the vehicle and a body of the trailer, which is defined by the at least one dimension of the trailer, are at a predetermined minimum distance if the vehicle is in the at least one coupling position.

10. The method according to claim 8, wherein:
a coupling angle between the longitudinal axis of the vehicle and the longitudinal axis of the trailer falls short of a maximum coupling angle, which is predetermined by the at least one dimension of the trailer, if the vehicle is in the at least one coupling position.

11. A computing device configured to carry out a method for assisting a driver of a vehicle during a coupling process of the vehicle with a trailer, according to claim 1.

12. A computer program, comprising commands causing the computing device of claim 11 to carry out the method steps according to claim 1.

13. A computer-readable (storage) medium, on which the computer program according to claim 12 is stored.

14. An assistance system for supporting a driver of a vehicle during a coupling process of the vehicle with a trailer, the system comprising:
a computing device according to claim 11,
at least one environmental sensor which provides environmental data that describe an environment of the vehicle, and
a human-machine interface for presenting at least one coupling position suggestion.

15. A vehicle comprising an assistance system according to claim 14.

* * * * *